(12) United States Patent
Rahmouni et al.

(10) Patent No.: US 9,183,506 B2
(45) Date of Patent: Nov. 10, 2015

(54) PERFORMING WHAT-IF ANALYSIS

(75) Inventors: Maher Rahmouni, Bristol (GB);
Marianne Hickey, Bristol (GB);
Claudio Bartolini, Palo Alto, CA (US);
Andrew Byde, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/818,677

(22) PCT Filed: Sep. 1, 2010

(86) PCT No.: PCT/US2010/047495
§ 371 (c)(1),
(2), (4) Date: Feb. 24, 2013

(87) PCT Pub. No.: WO2012/030333
PCT Pub. Date: Mar. 8, 2012

(65) Prior Publication Data
US 2013/0159242 A1    Jun. 20, 2013

(51) Int. Cl.
*G06N 5/04*      (2006.01)
*G06Q 10/06*    (2012.01)

(52) U.S. Cl.
CPC .......... *G06N 5/048* (2013.01); *G06Q 10/06313* (2013.01)

(58) Field of Classification Search
None
See application file for complete search history.

(56) References Cited

U.S. PATENT DOCUMENTS

| | | | |
|---|---|---|---|
| 7,756,678 B2* | 7/2010 | Bonissone et al. | 702/182 |
| 2004/0138933 A1 | 7/2004 | LaComb et al. | |
| 2006/0190310 A1* | 8/2006 | Gudla et al. | 705/7 |
| 2007/0124186 A1* | 5/2007 | Virine | 705/8 |
| 2007/0150327 A1* | 6/2007 | Dromgold | 705/8 |

FOREIGN PATENT DOCUMENTS

| | | |
|---|---|---|
| KR | 20050006554 A | 1/2005 |
| KR | 20090011146 A | 2/2009 |

OTHER PUBLICATIONS

"Answering what-if deployment and configuration questions with Wise", Tarig et al, Proceedings of the ACM SIGCOMM 2008 conference on Data communication, vol. 38 Issue 4, Oct. 2008, pp. 99-110.*
Korean Intellectual Property Office, International Search Report, May 13, 2011, 3 pages, Daejeon, Republic of Korea.
European Patent Office, Supplementary European Search Report, Feb. 18, 2014, 6 pages, Berlin, Germany.
(Continued)

*Primary Examiner* — Kakali Chaki
*Assistant Examiner* — Mai T Tran
(74) *Attorney, Agent, or Firm* — Alleman, Hall & McCoy Russell & Tuttle, LLP (57) ABSTRACT

Information relating to project metric data and occurrence of events in a plurality of projects is received (102). Uncertainty data is determined (106) based on the received information, where the uncertainty data represents a probability distribution of at least one metric associated with the active project. Input relating to a scenario to perform what-if analysis is received (108), and based on the input, what-if analysis is performed (110).

14 Claims, 5 Drawing Sheets

(56) References Cited

OTHER PUBLICATIONS

Rahmouni M et al., In: "LearnIT: Enhanced search and visualization of IT projects", Jun. 23, 2010, Mechanism for Autonomous Management of Networks and Services, Lecture Notes in Computer Science (LNCS) 6155, XP019145495, ISBN: 978-3-642-13985-7, pp. 114-117.

"Answering what-if deployment and configuration questions with WISE", Tarig et al.Proceedings of the ACM SIGCOMM 2008 conference on Data communication, vol. 38 Issue 4 Oct. 2008 pp. 99-100.

* cited by examiner

PERFORMING WHAT-IF ANALYSIS

BACKGROUND

Within an enterprise, such as a company, educational organization, government agency, and so forth, various projects are performed as part of the operations of the enterprise. Such projects are often evaluated by managers to determine their effectiveness, so that the managers can identify whether improvements should be made for future projects, and whether certain projects should be performed in the future.

BRIEF DESCRIPTION OF THE DRAWINGS

Some embodiments are described with respect to the following figures.

DETAILED DESCRIPTION

Various projects can be performed as part of operations of an enterprise, which can be a company, educational organization, government agency, or other organization. A "project" refers to a collection of activities to be performed by an individual or a group of individuals. For example, a project may be an information technology support project, a project related to development of a product, a project related to delivery of a service, and so forth. Various metrics are associated with the projects, and such metrics are used by users (e.g., project portfolio managers) to evaluate the projects. However, traditional project selection and optimization techniques typically assume that the various metrics associated with any particular project are deterministic. As a result, traditional project selection and optimization techniques may not offer the desired level of robustness with respect to project evaluation when project portfolio managers are considering which projects to select for performance in the future, and/or what improvements to make to such projects.

In accordance with some embodiments, what-if analysis systems or techniques are provided to allow project portfolio managers (or other users such as project planners) to determine what events are likely to occur with respect to projects, the likely impacts of such events. The events can include changes to various aspects of the projects. Other events can include addition of a project or removal of a project.

In addition, the what-if analysis systems or techniques according to some implementations can also determine uncertainties of the projects. Uncertainty associated with a project refers to uncertainty in a metric (or multiple metrics) associated with the project. Uncertainty associated with a project also refers to uncertainty in events. In some implementations, uncertainty data can be represented as a probability distribution that shows a distribution of the corresponding metric (with corresponding probabilities) and/or a distribution of the corresponding event (with corresponding probabilities). The uncertainty data can be presented in graphical form, in some implementations.

The what-if analysis systems or techniques according to some implementations, can also estimate an impact of an event on uncertainty data, by generating a representation of the change to the uncertainty data in response to the event.

The what-if analysis systems or techniques according to some implementations allow for more robust determinations of improvements/changes that should be made to projects, and also allow for more informed selections of projects to include in a particular portfolio. Because an enterprise has resources that allow the enterprise to support only a certain number of projects, more informed selection of projects to include in a portfolio can make the overall operations of the enterprise more efficient.

Based on results produced by the what-if systems or techniques, risks associated with various projects can be quantified. The quantification of risks associated with projects allows for project portfolio managers to select projects with lower risks to include in a portfolio. For example, two projects may involve usage of the same amount of resources, but a first project has a 0.1% chance of involving twice as many resources, while a second project has a 10% chance of involving twice as many resources, in response to some input event(s). In this scenario, to avoid a risky portfolio, the project portfolio manager can choose the first project over the second project, even though both the first and second projects specify usage of the same amount of resources.

Figure 1:
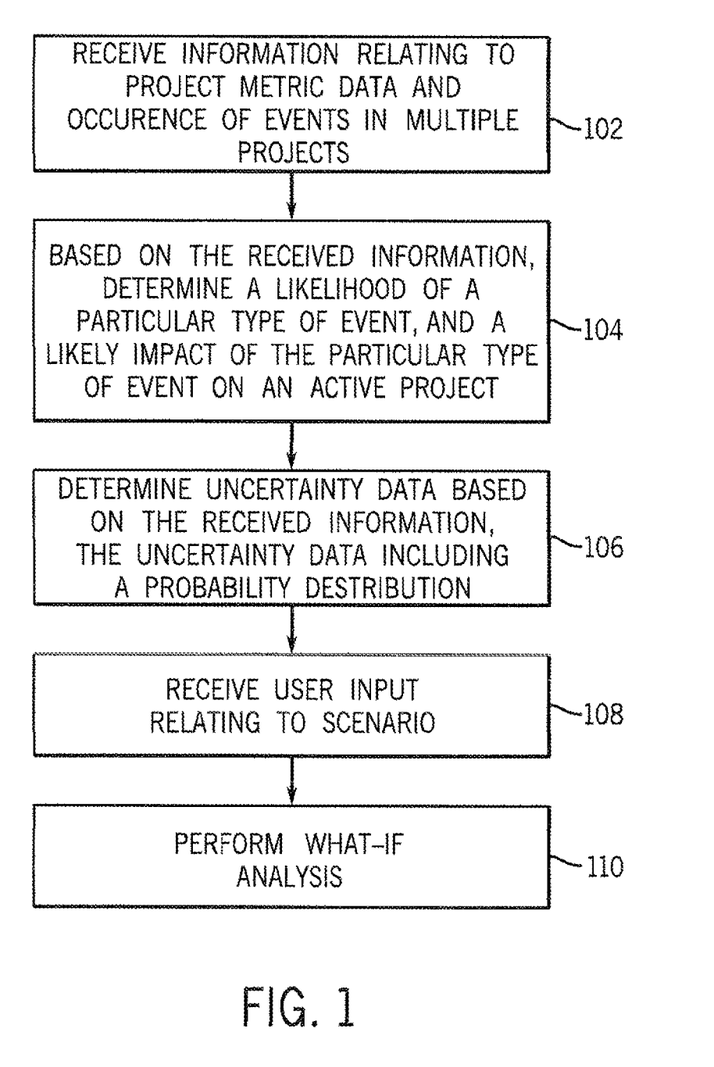
FIG. 1 is a flow diagram of a procedure according to some embodiments.

A procedure that can be performed by a what-if analysis system according to some embodiments is depicted in FIG. 1. Historical information relating to project metric data (e.g., cost data, time data, etc.) and the occurrence of events in multiple projects is received (at 102) by the what-if analysis system. The historical information relates to past projects that have been logged by an enterprise for future analysis. Based on the historical information, the system determines (at 104) a likelihood of a particular type of event (e.g., supplier failure) occurring in an active project (which is a current project that is to be analyzed), and an impact of the particular event type on the active project. This determination can be used later in performing what-if analysis, in which a user can enter event(s) into scenario(s) to be considered for the what-if analysis.

The what-if analysis system also determines (at 106) uncertainty data based on the historical information. The uncertainty data represents the probability distribution of at least one metric and/or event associated with the active project. To initiate the performance of what-if analysis, the what-if analysis system receives (at 108) user input regarding selection of data for a scenario. For example, the user input can include parameters of a particular anticipated event, where example parameters include event type, timing of event, size of event, etc. One specific example of an input scenario is "what if a supplier fails in my active project?" (in this case event type would be supplier failure). Alternatively, the user input can include selection or deselection or modification of parameters relating to event types derived from historical data. A "scenario" generally refers to an event or a collection of events, as defined by information based on user input relating to such event or collection of events.

In response to the received input scenario, the what-if analysis system performs (at 110) what-if analysis to determine an estimated impact of the event specified in the input scenario (received at 108) (e.g., the impact on a current project and the impact on a probability distribution related to the uncertainty data). A user interface can be used to show the impact.

Generally, "what-if scenario analysis" refers to a simulation that is performed for determining results in response to a given scenario, which is defined by a particular set of input parameters (e.g. a new event, selecting/deselecting events that were predicted using past project data, project parameters such as a different resource profile or budget, etc.).

The what-if analysis system allows a user (e.g., project portfolio manager or other personnel) to explore the consequences of different scenarios. The project portfolio manager can enter details of the scenario. For example, the project portfolio manager can enter specific events, with their respective likelihoods. An example event is a budget cut of 10%, with a likelihood of 50%. In some implementations, the project portfolio manager can alter other parameters of the active project, such as the values of manual estimates of metrics or a different resource profile. Also, the project portfolio manager can alter the set of related projects from which data is derived. In addition, the project portfolio manager can add or remove a project from the active portfolio with an associated likelihood and time. For example, the project portfolio manager can add a new project, with the likelihood of 30% in six months time.

The consequences of the scenario can then be viewed in user interfaces, such as those depicted in FIGS. 2 and 3, discussed further below. Based on this, the project portfolio manager can make a decision with respect to selection or deselection of the project for inclusion in a portfolio, for example. Also, a project planner can use this information to inform project planning.

Note that task 104 in FIG. 1 can also be considered as a what-if scenario analysis, if the selection of a set of past projects is considered as a scenario. This type of what-if scenario analysis can be used to help find suitable past projects to refer to when planning the current project.

In addition to performing what-if analysis, the what-if analysis system according to some implementations can be used (by a project portfolio manager, project planner, or other user) to view uncertainty data, including (1) viewing project metric (e.g. cost, time) uncertainty, derived using data from past related projects, including statistical information such as probability distributions, confidence limits, value at risk, etc.; and (2) viewing data on events that may occur throughout the project, derived using past project data, including the event type, the likelihood of the event, the timing of the event, the type and magnitude of impact, etc.

According to some implementations, the what-if analysis system provides a user interface representation that includes elements corresponding to various projects. An example user interface representation 200 is depicted in FIG. 2. The user interface representation 200 can be a graphical user interface (GUI) screen, for example. The user interface representation 200 depicts elements 202 corresponding to various projects, which can be projects that are being considered for inclusion in a portfolio.

Figure 2:
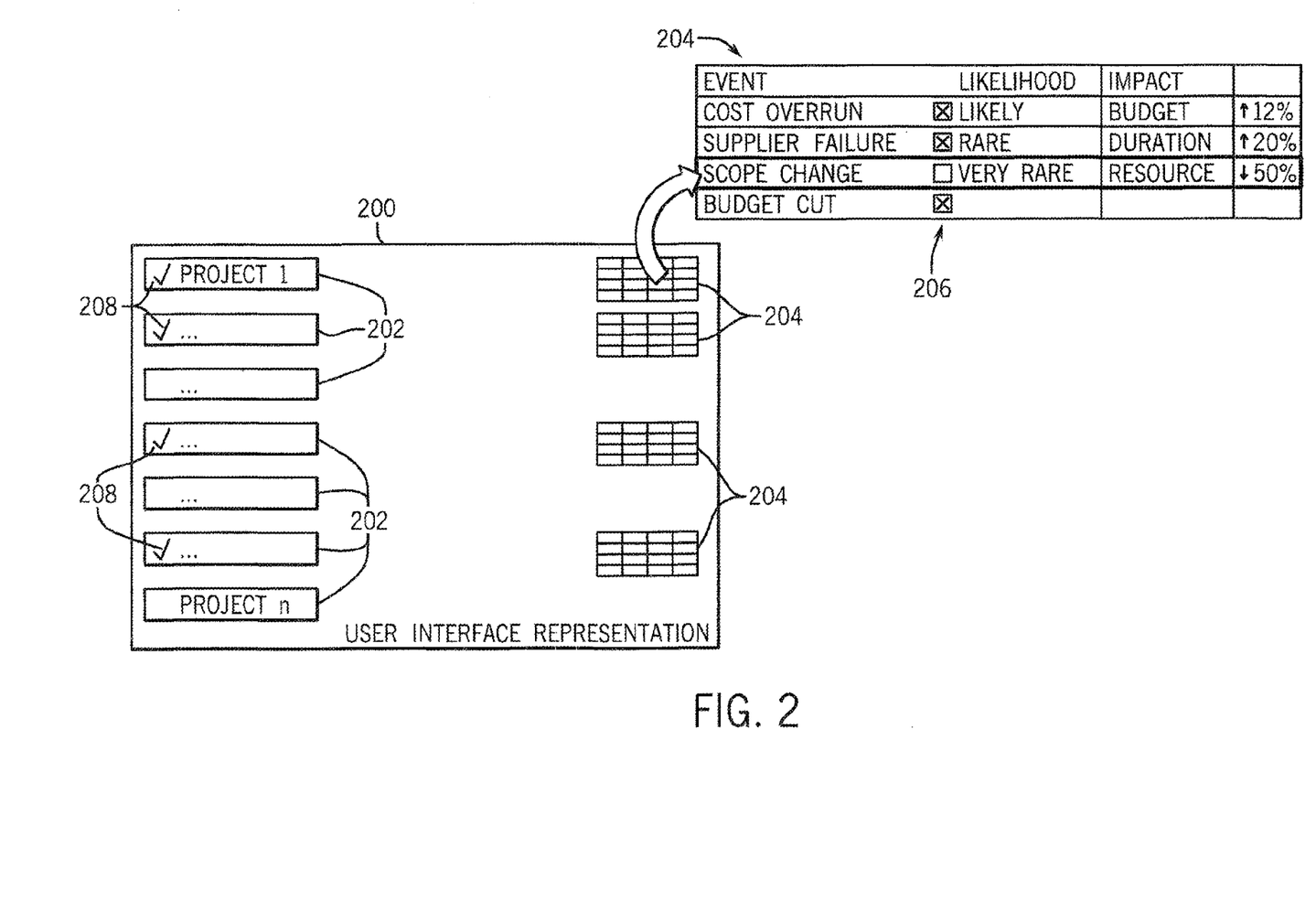
FIG. 2 is a schematic diagram of a user interface representation presented by a what-if analysis system according to some embodiments.

In the example user interface representation 200 of FIG. 2, n projects (project 1 to project n) are depicted. Each of the projects 202 of the user interface representation 200 is associated with project-level event information 204, which can be in the form of a table (or alternatively, in graphical form) according to some implementations. Example details of one of the tables 204 is shown in FIG. 2, where such table has a first column relating to events (or event types), a second column relating to likelihood of the event (or event type), a third column indicating the type of impact of the event or event type on the corresponding project 202 (the impact type corresponds to some metric of the project, such as cost, duration, resources, or any other measurable feature), and a fourth column having a percentage value that represents an estimated change in the relevant metric of the corresponding project 202 due to the respective event or event type (where an up arrow means an increase by the corresponding percentage, while a down arrow represents a decrease by the corresponding percentage). Note that each event or event type may have an impact on multiple project metrics. For example, a scope change event may have an impact on resources, budget and duration. In this case, there can be, for example, three sub-rows of columns 3 and 4 for each row of columns 1 and 2.

In some examples, the percentage values in the fourth column can indicate the anticipated change in usage of resources in response to the corresponding event. The example types of events shown in the example table of FIG. 2 include "cost overrun," "supplier failure," "scope change," and "budget cut" (although reference is made to specific examples of event types, it is noted that other implementations can use other event types) The table in FIG. 2 also includes boxes 206 that are user selectable. Selection of a box 206 (indicated by "X") indicates that a project portfolio manager is interested in performing what-if analysis using the corresponding event type, whereas deselection (indicated by lack of an "X") of a box 206 means that the project portfolio manager is no longer interested in performing what-if analysis using the corresponding event.

The project-level event information 204 can also include information on event timing, such as in an additional column. For example, the event timing can specify that a supplier failure is likely six months into the project.

The system initially derives the project-level event information 204 from past projects. As part of a scenario input, the user can manually add or edit events. Alternatively, the user can revert to the default information derived from past projects. The user can also save different scenarios.

The user interface can also indicate whether an event has been derived from past data or was manually entered by the user. For example, this can be indicated by using an additional column, or by use of some other type of indicator (e.g., different color or shading assigned to the respective row).

Note that there can be more than one entry (row) for each event type. For example, one entry can be derived from past data, while other entries are manually entered. The multiple entries for each event type can also indicate the likelihood and impact of that event type at different times—in this case, multiple events of the same type may be selected. In other cases, multiple events of the same type are not selected, as they represent conflicting scenarios (or the user interface warns of a conflicting scenario).

As part of the what-if scenario input, in FIG. 2, a user can also select and deselect corresponding ones of the projects 202 for inclusion in a portfolio. This is indicated by check marks 208, or lack thereof, which are associated with user-selectable elements for selection/deselection of projects. The presence of a check mark 208 in the corresponding project representation means that the corresponding project is selected to be included in the portfolio, while the absence of the check mark 208 in the corresponding project representation 202 means that the corresponding project is not selected to be included in the portfolio. Selection/deselection of a corresponding project by a project portfolio manager can be based on the content of corresponding tables 204 that are associated with the projects 202.

In addition, further output (such as that shown in FIGS. 3A-3C) from the system can also be used to inform selection/ deselection of a project. Such other output can indicate, as examples, uncertainty on project or portfolio metrics represented by probability distributions, confidence limits, or other statistical measures.

Figure 3A:
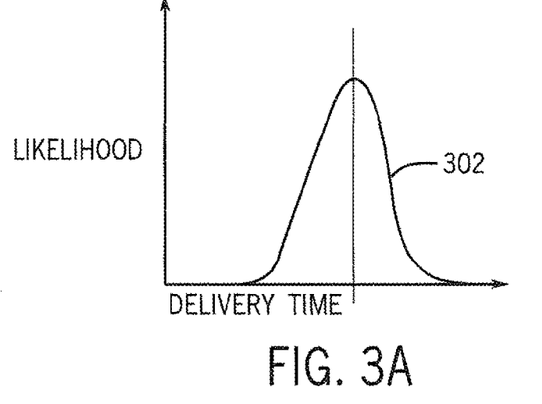
FIGS. 3A-3C are graphs illustrating probability distributions produced by the what-if analysis system according to some embodiments.
Figure 3B:
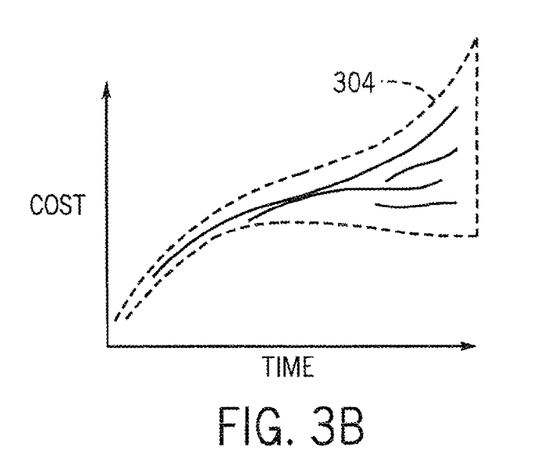
Figure 3C:
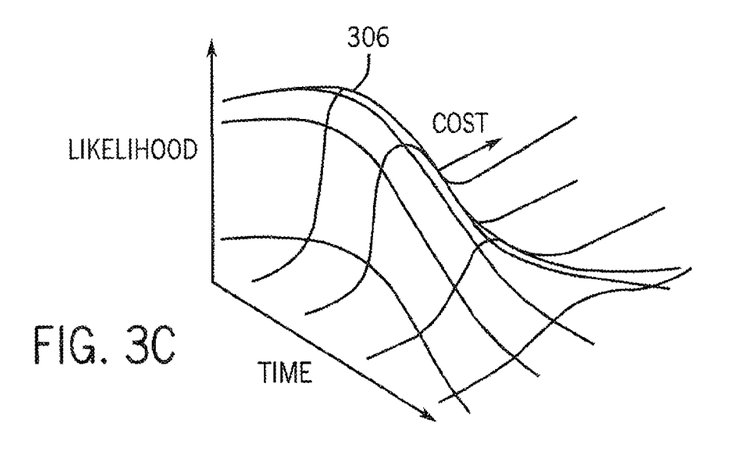

As noted above, the what-if analysis system according to some implementations is able to produce uncertainty data on project or portfolio metrics, which can be in the form of probability distributions, such as those depicted in FIGS. 3A-3C. Note that the output depicted in FIGS. 3A-3C apply to an individual project or to a portfolio of projects. The metrics depicted in FIGS. 3A-3C can be considered key performance indicators (KPIs). FIG. 3A shows the probability distribution of a first metric: delivery time. The graph of FIG. 3A shows a curve 302 representing likelihood as a function of delivery time (curve 302 indicates which delivery times are more likely than others). Likelihood is represented as a probability (percentage value).

FIG. 3B shows cost as a function of time. The cost over time is represented as a probability density 304, which depicts the likely costs of a project or a portfolio of projects over time. Different shadings or colors in the probability density 304 represent different probabilities (percentage values). In the example of FIG. 3B, the probability density 304 indicates that increased time for performing a project is generally associated with increasing cost.

FIG. 3B can show, for example, the estimated expenditure of a project over its lifetime. (Assuming a normal distribution, the estimated expenditure would be a line running through the center of the probability density, as time increases). As expected, the estimated expenditure will typically increase as a project is implemented. It also shows that the uncertainty of the estimated cost increases as time increases, indicated by the larger spread of the probability density as time increases FIG. 3C is a three-dimensional graph 306 that depicts the probability density of the cost of FIG. 3B in an alternative representation. The probability is mapped to the vertical axis (likelihood) of the graph of FIG. 3C, while time is mapped to a horizontal axis of the graph and cost is mapped to the third (z) axis.

It may be beneficial to view just the uncertainty of project metrics (such as the probability distributions depicted in FIGS. 3A-3C, etc.), without any reference to events. Based on data on the uncertainty of project metrics, the project portfolio manager can make a decision with respect to selection or deselection of the project for inclusion in a portfolio, for example. Also, a project manager can use this information to inform project planning.

A project portfolio manager can use the what-if analysis system according to some implementations to determine effects on probability distributions of certain metrics in response to occurrence of an event (or multiple events) in a particular project. Based on changes to the probability distribution, the project portfolio manager can make a decision with respect to selection or deselection of the project for inclusion in a portfolio, for example. Alternatively, the project portfolio manager can take steps to mitigate risks associated with the particular project in response to such event(s).

The outputs of the what-if analysis system according to some implementations allows a project portfolio manager to view events that may have an effect on a portfolio of projects, and how likely the events are to occur and their likely impact on key performance indicators. The project portfolio manager enters details of the scenario, via a user interface such as in FIG. 2. For example, the project portfolio manager can enter specific events, with their respective likelihoods. An example event is a budget cut of 10%, with a likelihood of 50%. Also, the project portfolio manager can enter information relating to timing of the event (e.g., the event may occur within three months). Also, the project portfolio manager can add or remove a project with an associated likelihood and time. For example, the project portfolio manager can add a new project, with the likelihood of 30% in six months time, and the consequences of adding such a project can be viewed. Similarly, the consequences of removing a project can also be determined.

Figure 4:
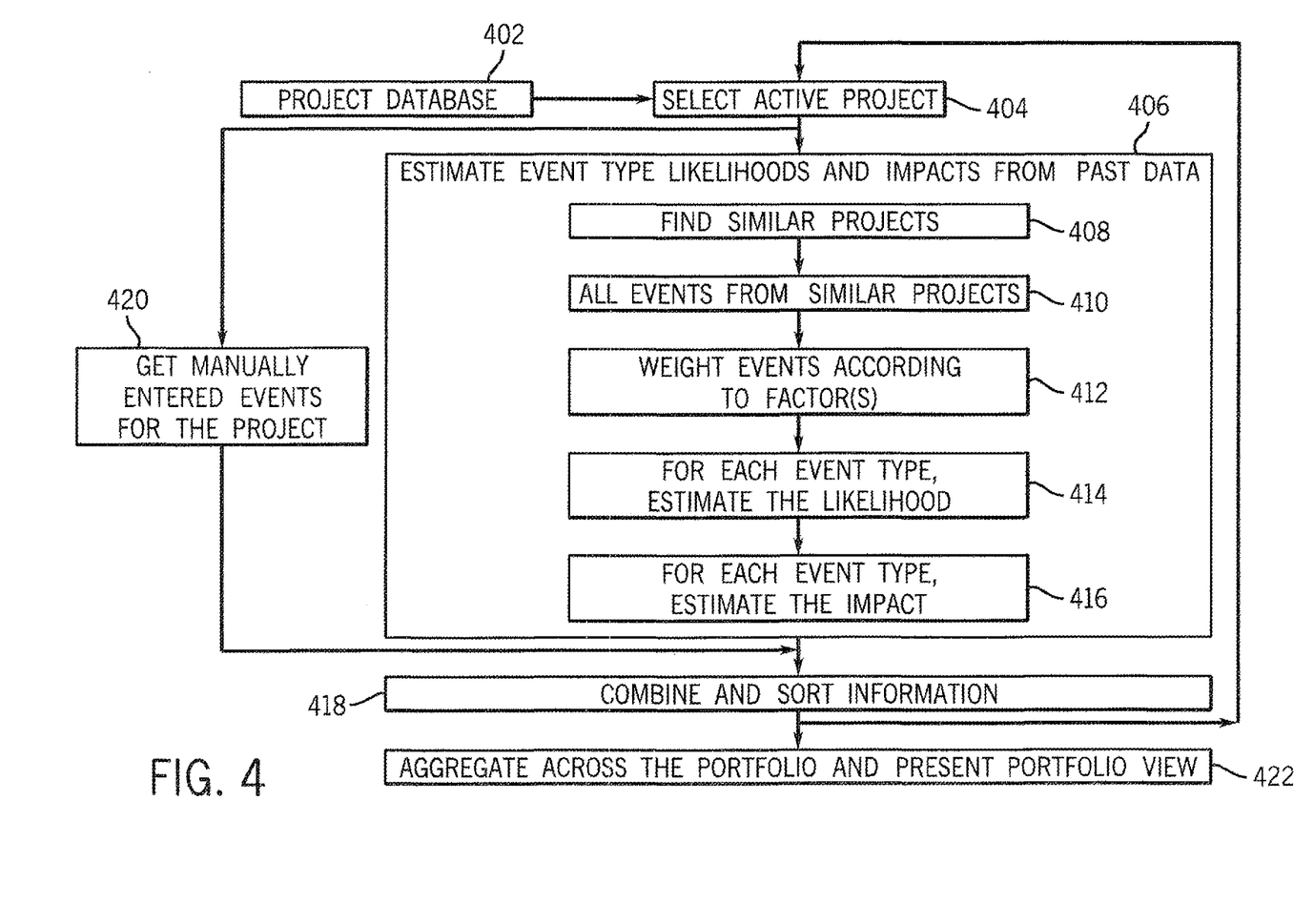
FIG. 4 is a flow diagram of a procedure to estimate a likelihood of occurrence of an event, and a likely impact of the event, in accordance with some embodiments.

FIG. 4 is a flow diagram of determining an estimated likelihood of an event occurring in an active project, and a likelihood impact of the event on the active project (corresponding to task 104 in FIG. 1), in accordance with some implementations. FIG. 4 depicts a project database 402 that stores information relating to various projects, including past projects as well as a current (active) project that is to be considered for inclusion in a portfolio.

Each project is associated with a project duration. The project duration of such project is split into a number of time periods $\{t_1, t_2, \ldots t_q\}$ each of a particular length (e.g., days, weeks, months, quarters, years, etc.). However, the length of each of the time periods $\{t_1, t_2, \ldots t_q\}$ is configurable according to the discretion of a user. The time period $t_1$ is the first time period of a project, and $t_q$ is the last time period of the project (or the last planned time period if the project is not complete). Note that q can be different for different projects, as total project duration may vary. Furthermore, each project includes a number of phases, which may be configured (e.g. requirements, development, test, etc.), and each phase may be associated with a number of time periods.

The events of a project can be recorded in a log and associated with the project in the project database 402. An event includes information about the event such as the event type (e.g., supplier failure, scope change, budget cut, etc.) and the timing of the event (e.g., the project phase and/or time period in the project's lifetime when the event started) and, possibly, other information describing the event such as the magnitude of the event, duration of the event, and how the magnitude varies over time.

An event can also include information about the impact of that event on the project, e.g., how the event changed metric values for the project. The information can include the type of impact (typically a project metric such as cost, time, or duration) and the size of the impact—for example, the impact relative to the current value of the metric (e.g., up 40%). Note that one event may have impact on multiple metrics, so the event can be associated with multiple impact type-size pairs. There may be additional information on the duration of the impact, timing of the impact or even how the magnitude varies over time.

As further shown in FIG. 4, from the project database 402, a current (active) project is selected (at 404) for consideration. For each project selected (at 404), the what-if analysis system estimates event type likelihoods and likely impacts (at 406) of events, based on information associated with past projects. The task 406 is associated with various sub-tasks that are shown within the box representing task 406.

Similar projects are identified (at 408). The identification of similar projects can be based on a predefined criterion (or multiple predefined criteria). For example, a similarity engine can use a predefined criterion (or predefined criteria) to find similar projects. In some examples, project similarity mechanisms as described in PCT Application No. PCT/US10/30518, entitled "Method and System for Comparing and Locating Projects," filed Apr. 9, 2010, can be used to find similar projects. In some examples, to ensure that the identified projects are in fact similar to the selected project, the identified similar projects can be presented to a user for confirmation by the user. The user can then provide feedback regarding which of the identified similar projects are in fact similar.

In alternative examples, instead of using a similarity engine to find similar projects, the similar projects can be identified based on manual input of users.

The events of the identified similar projects are retrieved (at 410), where information associated with such retrieved events include event type, impact, and magnitude of impact. In some examples, the retrieved events of the similar projects are weighted (at 412) according to factors such as timing, project similarity score, and/or other factors. For example, events that occur in the same project phase (e.g. requirements, development or test) as the phase that is under consideration from the active project (the project selected at 404) can be weighted more heavily than those from different phases. Alternatively, or in addition, events that occur in a similar time period to that time period under consideration of the active project can be weighted more heavily than events that occur in a less similar time period. In other examples, there is no such discriminative weighting. For each event type, the what-if analysis system estimates (at 414) the likelihood of the event type occurring in a current, active project (selected at 404). Also, for each event type, the what-if analysis system estimates (at 416) the likely impact of the event type on the active project. Tasks 412-416 are described in further detail below.

For each time period $t_d$ in the active project, $\text{proj}_a$ (selected at 404), from a current time period to a final time period $t_q$, the what-if analysis system can score the likelihood of each event type happening at that time period $t_d$, and estimate the impact that the event type would have on the active project, $\text{proj}_a$. An example of how this is done, for a given time period $t_d$, is given below.

For each similar project, $\text{proj}_s$, that is similar to the active project (as identified at 408), a time period $t_b$ is determined that represents a similar stage in the similar project $\text{proj}_s$ as time period $t_d$ of the active project $\text{proj}_a$. The following is an example of how this may be done:

$$b = \frac{d \cdot q_a}{q_a}$$

where b is an index of time period in similar project $\text{proj}_s$, d is an index of time period in active project $\text{proj}_a$, $q_a$ is a number of time periods in $\text{proj}_a$, $q_s$ is a number of time periods in similar project $\text{proj}_s$. The calculated index b is used to identify the time period $t_b$ of the similar project $\text{proj}_s$ that is considered to be at a similar stage as time period $t_d$ in the active project $\text{proj}_a$.

In some examples, user feedback can be provided to confirm that $t_b$ does represent a similar stage in $\text{proj}_s$ as time period $t_d$ of the active project $\text{proj}_a$.

For each similar project $\text{proj}_s$, consider a time window close to $t_b$. In this example, a time window of n time periods $(T_1 \ldots T_n)$ stretching back in time from $t_b$ is considered, where $T_1$ is the most recent period and $T_n$ is the most distant period. Alternatively, a time window where $t_b$ falls inside the window or a time window stretching forwards in time from $t_b$ are considered.

Each period of time in the window, $T_i$, is associated with a weight, $w_i$, where the weight is larger for time periods closer to $t_b$. Associating weights is performed at 412 in FIG. 4. In some examples, the weight is larger for more recent time periods, $w_i > w_{i+1}$, which serves to favor events that occurred in more recent time periods over those that occurred further back in the past, in both the scoring of event likelihood and event impact. For example, $w_i = 1/i, i = 1 \ldots n.$ The events from similar projects (identified at 408) are organized into groups according to which time period $T_1 \ldots T_n$ in the window they fall in, such that the total set of events is:

$E = \{E(T_1), E(T_2) \ldots, E(T_n)\},$ where $E(T_i)$ represents events that occurred in time period $T_i$. $E(T_i) = \{e_{i1}, e_{i2}, \ldots, e_{ip_i}\}$, where $p_i$ is the number of events in the time period $T_i$.

There is a set of event types, $C = \{c_1, \ldots c_m\}$, which occurred in the time windows of the similar projects, and for each period $T_i$ of the window there is a subset of event types $C(T_i) = \{c_{i1}, c_{i2}, \ldots\}$. Each event $e_{ij}$ in time period $T_i$ has an event type $c_{e_{ij}}$; an impact type $I_{e_{ij}}$ and an impact value $v_{e_{ij}}$.

Thus, for a given time period $T_i$ in the active project, there are events in the corresponding given time period $T_i$ of each of the plurality of projects of the received information. To calculate the likelihood of a particular event occurring in time period $T_i$, and to calculate the likely impact of the particular event on the project in time period $T_i$, the events from the time period $T_i$ are considered.

For each considered time period $t_d$ in the active project ($\text{proj}_a$) and for each event type, $c_x$, the following calculations are performed. First, the likelihood of the event type $c_x$ occurring in that time period based on data from past projects is calculated, for example using Eq. 1:

$$P(c_{xd}) = \frac{\sum_{i=1}^{n} w_i f_{ix}}{r}, \quad \text{(Eq. 1)}$$

where $f_{ix}$ the number of times $c_x$ occurs in the given time period $T_i$ in the similar projects, n is the number of time periods in the time window, and r is the number of similar projects. Note, with this example, for any similar project, if there is more than one event of the same type in the time window, only one is counted (the one in $T_i$ with the lowest i, for example).

Second, the likely impact of the event type $c_x$ at time $t_d$ is calculated based on data from past projects, for example using Eq. 2. For simplicity, this example assumes there is only one type of impact for an event type.

$$\text{Impact}(c_x) = \frac{\sum_{i=1}^{n} \sum_{j=1}^{p_i} w_i h_{ij}}{\sum_{i=1}^{n} w_i f_{ix}}, \quad \text{(Eq. 2)}$$

where $h_{ij} = v_{e_{ij}}$ (the impact value) for all events $e_{ij}$ of category $c_x$, $h_{ij} = 0$ otherwise, $f_{ix}$ = the number of times $c_x$ occurs in $T_i$, and $p_i$ is the number of events in the time period $T_i$.

As an alternative, or in addition to the above—using data from past similar projects, the likelihood of the event type $c_x$ occurring in any time period in the active project, and the corresponding impact, are calculated. As a further alternative, or in addition to the above, using data from past similar projects, the likelihood of the event type $c_x$ occurring from the current time in the active project, to the end of the project, and the corresponding impact, are calculated.

As further shown in FIG. 4, the what-if analysis system combines (at 418) the information on event type likelihoods and likely impacts derived from past data with manually entered events (if any, received at 420) for the project. The combined information can also be sorted. The combined information can be provided as project-level event information 204 shown in FIG. 2.

Additional active projects can be selected (at 404) and the computation of 406 repeated.

The what-if analysis system aggregates (at 422) the information for all projects across the portfolio. Such information is combined with manually entered portfolio-level events (entered in what-if analysis) and presented to the user, as a portfolio level view of the events, their likelihood and impact, such as in the form depicted in FIG. 2.

In addition to the foregoing, the what-if analysis system according to some implementations can also collect and aggregate uncertainty data. In some examples, uncertainty data can be as simple as allowing an input (by users) of ranges for certain metrics. Alternatively, uncertainty data can be mined by the what-if analysis system from past projects by comparing actual metric data with estimated metric data.

Figure 5:
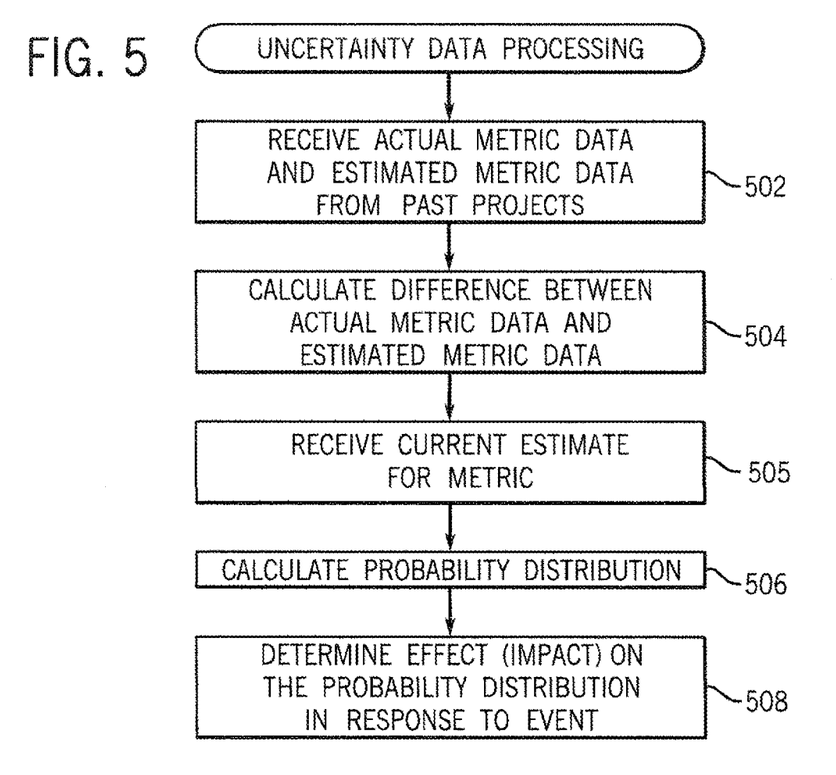
FIG. 5 is a flow diagram of uncertainty data processing according to some embodiments.

As shown in FIG. 5, actual metric data and estimated metric data are received (at 502) from past projects. The actual and estimated metric data correspond to various times during project execution. Each project can be split into time periods, for example days, weeks, months, quarters, years, and so forth: t=0 . . . n, where t=0 is prior to the project starting, t=1 is the first time period of the project, and t=n is the last time period of the project.

It can be assumed that the same time intervals are used for all projects and all times; if this is not the case some processing is performed to get a consistent data set. It can also be assumed that past projects have the same duration of n time periods; alternatively, the durations of the past projects do not have to be the same.

For each project q, at a given time $\tau$, there is a vector, $ye_q(\tau)$, which contains estimates for a metric y for each of a number of time periods in the project:

$$ye_q(\tau) = ye_{q\tau+1}, ye_{q\tau+2}, \ldots ye_{qn},$$

where $ye_{qt}$ is an estimate for metric y in project q at time period t.

The estimation vector $ye_q(\tau)$ is a snapshot of future estimations that were made at a particular time $\tau$ during the project q's execution. Estimations may be updated during project execution, for example by the project manager, and this is recorded by a new vector $ye_q(\tau)$. In practice, there may be multiple estimation vectors, estimated at different times $\tau$. One of such estimation vectors can be selected for a given calculation. The element $ye_{qt}$ may contain several pieces of information, including an estimate (or the mean estimate); upper and lower values of a range; and/or any other details about the distribution of the estimate.

For simplicity, below it is assumed that there is only one estimation vector, containing estimates made before the start of the project, and that each element of the estimated metric data vector, $ye_{qt}$ is a simple estimate:

$$ye_q = ye_q(\tau=0) = ye_{q1}, ye_{q2}, \ldots ye_{qn}.$$

In some examples, the entry of estimated future values for metrics can be provided by a project portfolio manager when planning a new project, referred to as project q. The estimated values of each metric, y, at time periods in the future for project q are:

$$ye_q = ye_{q1}, ye_{q2}, \ldots ye_{qn}, \text{ where } t=1 \ldots n.$$

In some examples, a range is defined for a particular metric y at a particular time period in the project, e.g., an estimation of the lowest likely value, $ye^l_{qt}$ and the highest likely value, $ye^h_{qt}$ is provided. For example, at 2 months into the project, the cost is estimated to be between $4 k and $6 k, and at 6 months into the project, the cost is estimated to be between $20 k and $30 k. The simplest case is where the user enters a range for the final value of y only.

Let $\mu ye_{qt}$ be the mean of the estimated range of metric y for project q at time t (e.g., the range entered by the user):

$$\mu ye_{qt} = (ye^l_{qt} + ye^h_{qt})/2.$$

Then $ye_{qt} = \mu ye_{qt}$, and a vector $ye_q$ is constructed as discussed.

In addition, for each project q, and each metric y, there is a vector of actual data, $ya_q$, which contains values at each n time periods in the project:

$$ya_q = ya_{q1}, ya_{q2}, \ldots ya_{qn}$$

Next, the what-if analysis system calculates (at 504) the difference between actual metric data and estimated metric data. A parameter $y'_{qt}$ is defined as a measure of the difference between the actual and estimated values for metric y in a given time period t in project q; for example, this could be the relative difference calculated by:

$$y'_{qt} = (ya_{qt} - ye_{qt})/ye_{qt},$$

where $y'_{qt}$ is positive for an underestimate, and negative for an overestimate.

For example, if the metric estimate ($ye_{qt}$) was 100, but the actual metric data ($ya_{qt}$) was 110, $y'_{qt} = 0.1$.

In a given time period, t, a vector $y'_t$ represents the discrepancy between the actual and estimated values for metric y for all projects q:

$$y'_t = y'_{1t}, y'_{2t}, \ldots y'_{zt}, \text{ where } q=1 \ldots z.$$

For all n time periods, for each metric y, there is a matrix of discrepancies between actual and estimated metric values:

$$y' = y'_1, y'_2, \ldots y'_n.$$

A simple case is where only estimates for the final values of y, in all projects are available:

$$y' = y'_n.$$

A current estimate for the metric y is also received (at 505).

Next, a probability distribution is calculated (at 506) for a given metric y in an active project. For the given metric y from the active project, at a given time period t, a distribution of estimates is determined, which can be plotted in graphs such as the ones shown in FIGS. 3A-3C.

A normal distribution is assumed in some examples, and the probability density function, f(x) can be used:

$$f(x) = \frac{1}{\sqrt{2\pi\sigma^2}} e^{\frac{-(x-\mu)^2}{2\sigma^2}} = \frac{1}{\sigma} \phi\left(\frac{x-\mu}{\sigma}\right),$$

where x=y, $\mu$ is the mean of the sample data for y, $\sigma^2$ is the variance.

For a standard normal distribution, $\mu=0$ and $\sigma^2=1$, such that $$\phi(x) = \frac{1}{\sqrt{2\pi}} e^{-\frac{1}{2}x^2}.$$

The probability distribution, and related measures such as confidence intervals, can be derived from the manually entered range estimations or from data on past projects. Some examples are presented below.

A first technique of determining a probability distribution finds new estimates for an active project by adjusting the current estimates (received at 505) based on the discrepancy between actual and estimated data from past similar projects. Projects that are similar to the one being executed/planned (project p) are identified.

For each metric y, an estimation accuracy, y', is obtained from past projects (see definition of y' above).

For the current time period t of project p and, for each metric y, a matrix y' is selected that contains discrepancies between actual and estimated data for past projects. Where there are multiple estimates for any given past project (for example, estimates that were made at the start of the project and later updated during that project's execution), construct the matrix y' such that it is based on the most appropriate estimates, for example, those made in similar time periods to the time period of the active project p.

A vector is identified, which is yp', the subset of the matrix y' that corresponds to these similar projects.

The effect that the same estimation discrepancy from a past similar project would have on an estimate for the current project is determined. For example:

$$yp''_{qt} = ye_{pt}(1 + yp'_{qt}),$$

where $yp'_q$ is an over- or under-estimation in past similar project q at time t, $ye_{pt}$ is an initial estimated value of metric y at time t for active project p, $yp''_{qt}$ is a new estimated value of metric y, adjusted by results from past similar project q.

For example, if for project p the estimate for y at time t ($ye_{pt}$) is 100, but there were two past similar projects that underestimated the value for y at time t by 10% and 20%, then $$yp'_{1t} = 0.1,$$

$$yp'_{2t} = 0.2,$$

$$yp''_{1t} = 110,$$

$$yp''_{1t} = 120.$$

A new matrix yp'' is constructed to represent the spread of estimates derived from data on past similar projects:

$$yp'' = yp''_1, yp''_2, \ldots yp''_n,$$

$$yp''_t = yp''_{1t} \ldots yp''_{rt},$$

where $yp'_{qt}$ is defined above, t=1 . . . n time periods, and q=1 . . . r past projects, similar to project p.

Once there is a spread of estimates, the probability distribution for each time period t can be derived. Let "yp"$_t$ be the mean of yp"$_t$, $$\mu = \mu_{yp''_t} = \frac{\sum_{q=1}^{r} yp''_{qt}}{r},$$

and let the variance of yp"$_t$ be the sum of squared deviations from the mean divided by the number of similar projects, r.

$$\sigma^2 = \sigma^2_{yp''_t} = \frac{\sum_{q=1}^{r} (yp''_{qt} - \mu_{yp''_t})^2}{r}$$

Alternatively, use the sample standard deviation $$s = \sqrt{\frac{1}{N-1} \sum_{i=1}^{N} (x_i - \bar{x})^2},$$

where $\{x_1, x_2, \ldots, x_N\}$ is the sample (i.e., yp"$_t$) and $\bar{x}$ is the mean of the sample (i.e., $\bar{x} = \mu_{yp''_t}$). This correction (the use of N−1 instead of N) is known as Bessel's correction. The reason for this correction is that $s^2$ is an unbiased estimator for the variance $\sigma^2$ of the underlying population, if that variance exists and the sample values are drawn independently with replacement. However, s is not an unbiased estimator for the standard deviation $\sigma$; it tends to underestimate the population standard deviation.

Then the standard error of the mean (SEM) is:

$$SEM = \frac{\sqrt{\sigma^2_{yp''_t}}}{\sqrt{r}}.$$

To determine the confidence limits (the limits within which a given percentage of the observations in a normal distribution can be found) the following equation may be used:

$$\mu_{yp''_t} \pm (SEM * C_{95}),$$

where C=$C_{95}$=1.96, (95% confidence limits), C=$C_{99}$=2.576, (99% confidence limits), or C=$C_{90}$=1.645, (90% confidence limits).

A second technique of determining a probability distribution, which may be used where the estimate for a project metric is a range, assumes a normal distribution for a given metric and that the range entered is the 95% confidence limit, and this is used to find the variance $\sigma^2$. The mean and the variance are provided, and the probability distribution at any given time can be plotted.

If there is data from past projects, the first technique using the mean of the range as the estimates for an active project can be applied. The resulting distribution(s) is plotted, and new confidence limits are calculated and compared to those from the initial estimates.

A third technique of determining a probability distribution estimates the probability of types of events occurring in the active project at a given time, and their impact. Let $\mu$ be the mean of the range of metric y entered by the user, $\mu = (y^l + y^h)/2$.

Also, let $P_x$ be the probability of the $x^{th}$ event type occurring at a given time (e.g. as defined by Eq. 1): $0 \leq P_x \leq 1$. In addition, let $I_{xy}$ be the impact of the $x^{th}$ event type on the $y^{th}$ metric (e.g. see Eq. 2), normalized such that $-1 \leq I_x \leq 1$.

A parameter $\mu'$ is a new mean of metric y, given the event data from past projects, which can be calculated by an equation such as the following, for example:

$$\mu' = \mu \left( 1 + \frac{\sum_{x=1}^{n} p_x I_{xy}}{\sum_{x=1}^{n} g_x} \right)$$

where $g_x=0$ if $I_{xy}=0$, and $g_x=1$ otherwise.

A variance of y, given the event data from past projects, can be calculated by an equation such as:

$$\sigma^2 = \frac{\sum_{x=1}^{n} P_x(\mu((1+I)_{xy}) - \mu')^2}{\sum_{x=1}^{n} P_x}.$$

From this, the probability distribution and confidence limits can be calculated (in a similar way as the first technique). These results, that use knowledge of past projects, can be compared with the results where there are manual estimates only.

As further depicted in FIG. 5, after the probability has been determined at 504, an effect on the probability distribution in response to a particular event is determined (at 508). One example event can be that a supplier failure occurs in three months time with 40% probability. The likely impact of the event is identified by looking at that type of event from past similar projects at similar times, similar to techniques discussed above. An event has an impact type and an impact value at a given time. For example, $ye_t = ye_t(1+i)$ in $t=3$ months time, with probability 0.4.

There will be several impact values at time periods stretching forwards from t (unless it is assumed that the impact value is the same for all time periods stretching forwards from t).

A new distribution can be calculated based on the new estimates. One way of displaying such a new distribution is to superimpose the new distribution on the old probability distribution. Alternatively, the actual metric data from past projects can be displayed that had a similar event.

Figure 6:
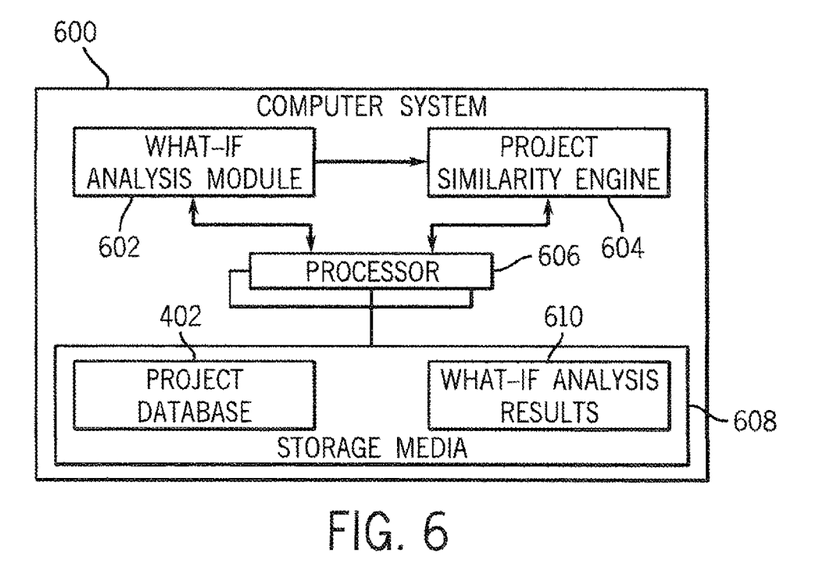
FIG. 6 is a block diagram of a what-if analysis system according to some embodiments.

FIG. 6 depicts an example of a computer system 600, which can be implemented as a single computer node or multiple computer nodes in a distributed environment. The computer system 600 includes a what-if analysis module 602 that is able to perform various tasks discussed above, such as those of FIGS. 1, 4, and 5. In addition, the what-if analysis module 602 is able to invoke execution of a project similarity engine 604 for finding projects that are similar to an active project (e.g., task 408 in FIG. 4).

The what-if analysis module 602 and project similarity engine 604 can be implemented as machine-readable instructions executable on a processor (or multiple processors) 606. A processor(s) 606 is (are) connected to a storage media 608, which stores the project database 402 (that stores information of projects), and results 612 of what-if analyses.

The machine-readable instructions of the modules 602 and 604 are loaded for execution on a processor (or multiple processors). A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a computer system, information relating to project metric data and an occurrence of events in a plurality of projects;
determining, by the computer system, uncertainty data based on the received information, wherein the uncertainty data represents a probability distribution of at least one metric associated with an active project;
receiving, by the computer system, input relating to a scenario to perform what-if analysis; and
based on the input, performing, by the computer system, the what-if analysis to determine an estimated impact of a particular event specified in the input scenario on the active project and on the probability distribution of the at least one metric.

2. The method of claim 1, further comprising:
for a given time period in the active project, identify events in a corresponding given time period of each of the plurality of projects of the received information; and
determining, based on the identified events in the corresponding given time period of each of the plurality of projects, a likelihood of the particular event occurring and a likely impact of the particular event.

3. The method of claim 2, wherein the particular event is of a particular type, and wherein identifying the events comprises identifying the events of the particular type in the corresponding given time period of each of the plurality of projects.

4. The method of claim 3, wherein determining the likelihood of the particular event occurring in the given time period of the active project comprises determining the likelihood of the particular event occurring based on a total number of times events of the particular type occur in the given time period of the plurality of projects.

5. The method of claim 3, wherein determining the likely impact of the particular event on the active project in the given time period is based on impact values associated with the events of the particular type in the given time period of the plurality of projects.

6. The method of claim 1, wherein determining the uncertainty data is based on calculating differences between actual values and estimated values of the at least one metric in the plurality of projects of the received information.

7. The method of claim 6, further comprising:
providing a first vector representing estimated values of the at least one metric for the plurality of projects;
providing a second vector representing actual values of the at least one metric for the plurality of projects;
computing a result vector based on a difference between the first and second vectors, wherein the result vector contains values corresponding to the differences between the actual values and the estimated values of the at least one metric in the plurality of projects.

8. The method of claim 7, wherein the first vector represents the estimated values of the at least one metric in a given time period of the plurality of projects, and the second vector represents the actual values of the at least one metric in the given time period of the plurality of projects.

9. The method of claim 1, further comprising presenting a graph of the probability distribution in a user interface.

10. An article comprising at least one computer-readable storage medium storing instructions that upon execution cause a computer system to:
identify, for an active project, a plurality of past projects related to the active project;
calculate, based on information associated with the plurality of past projects, likelihood of occurrence of a particular type of event and a likely impact of the particular type of event;
calculate, based on the information associated with the plurality of past projects, uncertainty data representing a probability distribution of at least one metric of the active project; and
estimate, as part of what-if analysis, an impact of the particular type of event as specified in an input scenario on the probability distribution of the at least one metric.

11. The article of claim 10, wherein the instructions upon execution cause the computer system to further:
generate a user interface representation including elements corresponding to multiple active projects, wherein the user interface representation further includes information relating to a likely impact of the particular type of event on each of the multiple active projects.

12. The article of claim 11, wherein the user interface representation further includes user-selectable elements corresponding to the multiple active projects, wherein the instructions upon execution cause the computer system to further:
receive selection or deselection of the corresponding user-selectable elements that indicate which of the multiple active projects have been user selected to include in a portfolio based on the information relating to a likely impact of the particular type of event on each of the multiple active projects.

13. The article of claim 10, wherein the particular type of event is part of a user input scenario, and wherein the user input scenario is provided through a user interface in which a user is able to select or deselect events or to manually add or edit events.

14. A computer system comprising:
a storage media to store information relating to a plurality of past projects, wherein the information includes a plurality of events in each of the past projects; and
at least one processor configured to:
based on the events of the past projects in a particular time period of each of the past projects, determine a likelihood of a particular event occurring in the particular time period of an active project, and a likely impact of the particular event on the active project in the particular time period;
determine uncertainty data based on differences between estimated metric data and actual metric data of the past projects, wherein the uncertainty data represents a probability distribution of at least one metric associated with the active project;
determine an estimated impact of a particular event in an input scenario on the probability distribution as part of the what-if analysis; and
generate a modified probability distribution based on the estimated impact.

* * * * *